United States Patent [19]

Shia et al.

[11] Patent Number: 4,765,968
[45] Date of Patent: Aug. 23, 1988

[54] FLUORINATED CARBON COMPOSITION FOR USE IN FABRICATING A LI/CF$_x$ BATTERY CATHODE

[75] Inventors: George A. Shia, North Tonawanda; David J. Friedland, Snyder, both of N.Y.

[73] Assignee: Allied-Signal Inc., Morris Township, Morris County, N.J.

[21] Appl. No.: 59,456

[22] Filed: Jun. 8, 1987

Related U.S. Application Data

[62] Division of Ser. No. 776,546, Sep. 16, 1985, Pat. No. 4,686,161.

[51] Int. Cl.$^4$ .................. C01B 31/00; H01M 4/60
[52] U.S. Cl. .................. 423/445; 423/448; 423/489; 423/496; 429/213
[58] Field of Search .............. 423/445, 448, 449, 496, 423/489; 570/150, 124; 429/212, 218, 213; 528/401

[56] References Cited

U.S. PATENT DOCUMENTS

| | | | |
|---|---|---|---|
| 3,700,502 | 10/1972 | Watanabe et al. | 429/212 X |
| 4,139,474 | 2/1979 | Watanabe et al. | 252/1 |
| 4,438,086 | 3/1984 | Aramaki et al. | 423/445 X |
| 4,686,161 | 8/1987 | Shia et al. | 429/50 |

Primary Examiner—Anthony Skapars
Attorney, Agent, or Firm—Jay P. Friedenson

[57] ABSTRACT

A means to eliminate the suppression of the closed circuit voltage of a Li/CF$_x$ battery during the initial part of its discharge is effected by blending an additive CF$_x$ which does not show significant voltage suppression with the (bulk) CF$_x$ that is normally used in fabricating cathodes for such batteries. Blending is used to get a mixture which has substantially minimized voltage suppression and has good capacity.

The closed circuit voltage of a Li/CF$_x$ battery during the initial 10% of discharge is known to be lower than the closed circuit voltage during the later stages. This characteristic adversely impacts applications since the voltage at beginning of life is as low as the voltage indicating end of life, complicating design of circuitry to indicate end of life.

In the disclosure, the material with no significant voltage suppression discharges preferentially at the beginning of discharge leading to higher voltage and no suppression. The bulk material also discharges to some extent during this early stage of discharge. When the small percentage of coke-based CF$_x$ additive is depleted, the bulk CF$_x$ has discharged to the point that it no longer shows voltage suppression.

3 Claims, 4 Drawing Sheets

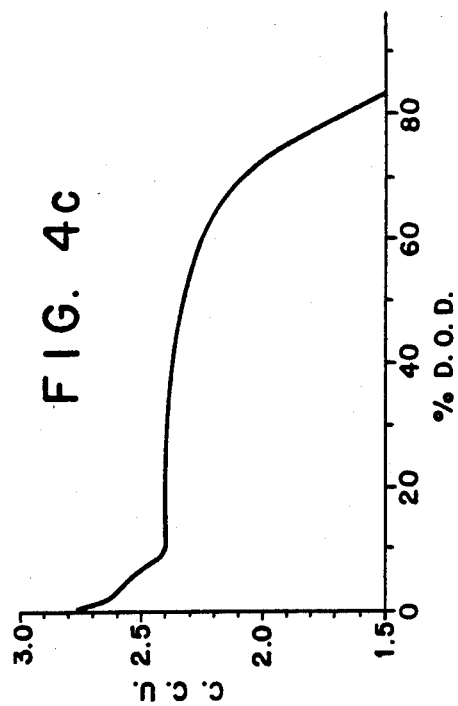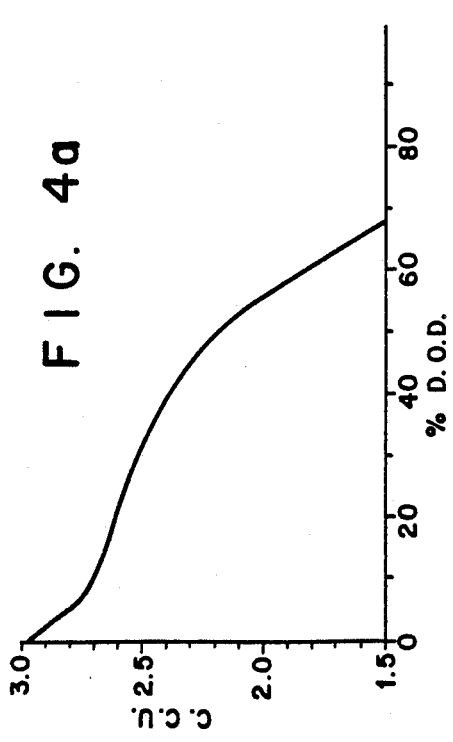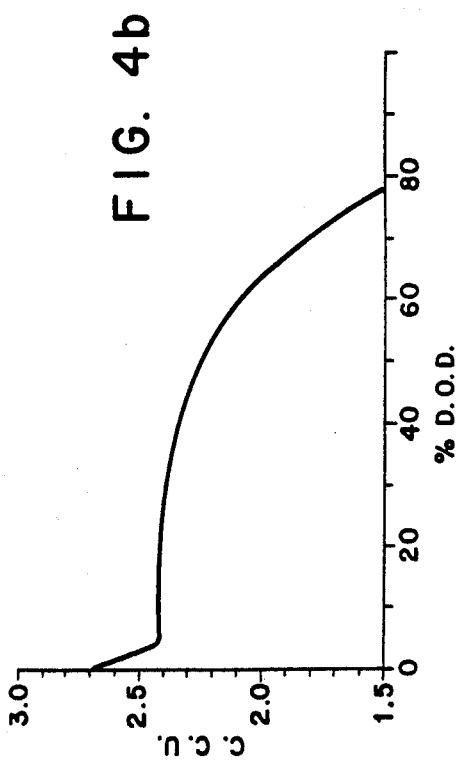

FLUORINATED CARBON COMPOSITION FOR USE IN FABRICATING A LI/CF$_x$ BATTERY CATHODE

This application is a division, of application Ser. No. 776,546, filed Sept. 16, 1985, now U.S. Pat. No. 4,686,161.

DESCRIPTION

This invention relates to an improved lithium/fluorinated carbon (Li/CF$_x$) battery. More particularly, the invention relates to a composition and method for substantially eliminating the suppression of the closed circuit voltage of a Li/fluorinated carbon battery during the initial part of its discharge by incorporating into the fluorinated carbon composition of the Li/CF$_x$ battery a different CF$_x$ such that the reformulated blend of at least two fluorinated carbons does not exhibit voltage suppression. The blending of the different fluorinated carbons provides the desired mixture with no appreciable voltage suppression while at the same time retaining good capacity.

BACKGROUND OF THE INVENTION

Numerous disclosures have been made in the prior art with the aim of improving the initial discharge voltage of the lithium/fluorinated carbon batteries. Illustrative of such prior art efforts to eliminate or reduce initial voltage suppression are the disclosures in the following references wherein admixtures of different fluorinated carbonaceous materials are used for the purpose of achieving some improvement in discharge voltage:

Japanese Kokai No. 82 84,570 discloses a mixture of fluorinated carbon (CF$_n$) and fluorinated graphite (C$_2$F)$_n$ with the relative proportions of (C$_2$F)$_n$ ranging from 10:100 to 100:100. Mixtures of (C$_2$F)$_n$ and fluorinated carbon are disclosed as giving lithium batteries with improved discharge characteristics. The (C$_2$F)$_n$ additive in that reference is distinguished from fluorinated carbon (CF)$_n$ (i.e., CF$_x$) by its stoichiometry and completely different crystal structure. These differences in structure are described in U.S. Pat. No. 4,139,474. (C$_2$F)$_n$ must be prepared by reacting graphite for long times with fluorine with 100–200 hours being typical reaction times. The coke based CF$_x$ with which the present invention is concerned, and which is distinct from the fluorinated graphite of Japanese Kokai No. 82 84,570 can be made in less than 24 hours by reacting the coke starting material with fluorine at from 300° C. to 600° C. Use of the coke-based material, CF$_x$ is otherwise relatively generally advantageous over the graphite based material, (C$_2$F)$_n$ In U.S. Pat. No. 4,139,474, (C$_2$F)$_n$ is distinguished in several respects from CF$_x$; by X-ray diffraction (see line 57, col. 4): IR (see line 59, col. 5); ESCA (see line 31, col. 5), and specific gravity (see line 26, col. 6). Other physical and chemical differences are also enumerated at line 32, column 6, et seq. The starting carbon which must be used to prepare (C$_2$F)$_n$ is described at col. 8, line 26 et. seq. That patent specifies that any carbon having a Franklin's P-value of from 0 to about 0.6 will be acceptable starting material from which (C$_2$F)$_n$ can be prepared. The Franklin's P-values for the cokes used in the present invention, see examples I, II and IV are primarily outside this range. Furthermore, as seen at column 8, starting at line 43 of U.S. Pat. No. 4,139,474 natural graphite is the preferred starting carbon to prepare (C$_2$F)$_n$ and that while petroleum cokes can be used, they must be heattreated (or calcined) at temperatures between 2000° C. and 3000° C. In the present invention, the materials are petroleum-based coke products prepared normally by heat treatment below 2000° C., or at most about a maximum of about 2000° C. (Example III). Basis supporting a distinction of the invention from Japanese Kokai No. 82 84,570 is also found in Kirk-Othmer's Encyclopedia of Chemical Technology, page 557, wherein, the differences between carbon and graphite are described. Carbon, which includes coke, is made from carbonaceous material which is heat-treated at temperatures between 800° C. and 1400° C.; graphite is prepared by further heat treatment at temperatures in excess of 2400 degrees. In the present invention, the starting carbons must be carbonaceous materials heat-treated at a temperature between about 800° C. and 2000° C. Further, as indicated by reference to U.S. Pat. No. 4,139,474 particularly concerning the starting carbons used in that patent, it is clear that the carbons used in Japanese Reference No. 82 84,570 are clearly different from the petroleum cokes employed in the invention.

The disclosures in the above-mentioned Japanese Kokai No. (82 84,570) indicate that the addition of amounts (C$_2$F)$_n$ to (CF)$_n$ improves the drop in the initial voltage over that of (CF)$_n$ alone, because the two materials are similar in nature and discharge via similar mechanisms. We have discovered, however, that undesirable results in the initial stages of the discharge curve still occur when similar materials are blended and that other and more important criteria must be used to guide the selection of the best additive material to suitably eliminate the undesirable initial voltage suppression. Accordingly, it is important according to our discovery that the CF$_x$ material added to the bulk CF$_x$ material be different from the bulk material.

Japanese Kokai No. 77 10,519 discloses that graphite fluoride which reacts with potassium iodide (KI) to produce greater than $1.25 \times 10^{-6}$ mole of free iodine (I) per gram of CF$_x$ can be used in a cell and that this material gives a cell which does not undergo voltage lowering (i.e., voltage suppression) during the initial part of discharge. The example given in that reference is for a graphite fluoride which liberates $4 \times 10^{-6}$ mole of I per gram of material. This reference does not disclose the desirability of blending this material with CF$_x$ nor does it address the deleterious effects of using a material with such a large content of a highly oxidizing species in a lithium battery. In fact, a later Japanese Kokai No. 77 21,621 to the same assignee claims that a graphite fluoride which reacts with KI to give less than $1.25 \times 10^{-6}$ mole of I per gram of material can be used in a lithium cell to give one with good voltage after storage. In the example described, two cells are compared; one made from a graphite fluoride with liberates $2.9 \times 10^{-7}$ mole of I per gram and one that liberates $1 \times 10_{-6}$ mole of I per gram of material. After storage at 70° C. for 1 month, the cells were discharged at 20° C. on a 8 ohm load. After 10 hours, the first cell gave 2.3 V compared to the second cell which gave 1.3 V. In light of Japanese Kokai No. 77 21,621, the graphite fluoride described in Japanese Kokai No. 77 10,519 may eliminate voltage suppression but suffers from the fact that a long lasting, i.e., durable lithium battery cannot be made with it.

Japanese Kokai No. 84 31,564 discloses the use of carbon containing adsorbed fluorine in the $CF_x$ electrode to replace the carbons which are typically used to enhance the electronic conductivity of the electrode matrix. Adsorbed fluorine, because of its strongly oxidizing nature, may be very deleterious and is regarded as disadvantageous.

The use of fluorinated carbon black is disclosed in Japanese Kokai No. 83 05,967. The carbon black which is prescribed is that which has a surface area greater than 800 m2/g. Use of this material in mixtures with $CF_x$ is disclosed as improving the initial discharge voltage of the lithium cell. However, N. Watanabe, et al., *SOLID STATE IONICS*, page 503 (1980), has shown that fluorinated carbon blacks perform more poorly, particularly at high rates of discharge, than do coke-based fluorinated materials. In light of this disclosure, it cannot be expected that fluorinated carbon black would be as effective in curing the voltage suppression phenomenon as is a coke-based fluorinated material.

Japanese Kokai No. 83 206,057 discloses the incorporation of a noncovalent graphite fluoride intercalation compound into a graphite fluoride cathode for the purpose of improving the initial discharge voltage. Examples are graphite intercalates of $AlF_3$ or $MgF_2$ and fluorine. The disclosure of this publication differs from the present invention in that the additive is a noncovalent intercalation compound of graphite and that the major cathode active material is graphite fluoride as distinguished from fluorinated carbon.

Other Japanese patent publications disclose the use of a variety of materials which do not contain fluorine and have been claimed to eliminate or reduce the severity of voltage suppression in $Li/CF_x$ cells. Thus, Japanese Kokai No. 83 123,663 discloses the addition of aluminum powder; Japanese Kokai No. 83 206,058 discloses the addition of aluminum fiber to $CF_x$ cathode compositions for the purpose of stabilizing the initial discharge voltage; and Japanese Kokai No. 83 161,260 discloses the addition of compounds of the form $Cr_xO_y$ where $15 < y/x < 3$. Examples given are $Cr_3O_6$ and $Cr_2O_5$ and these additives are claimed to improve the initial drop in cell voltage. In each case, a metal or metal salt is added to the cell and therefore differ from our invention.

Additionally, Japanese Kokai No. 82 124,865 discloses that $Li/CF_x$ cells can be partially discharged ($\leq 10\%$ of the cell capacity is removed) to improve the initial discharge voltage. This practice minimizes the problem but suffers from several disadvantages; an additional step is required in the production process, processing time is increased, and additional equipment is required.

In summary, with respect to the prior art, while it is known that various blends and admixtures of fluorinated carbon compositions have been employed to improve performance, a need exists for an improved practical fluorinated carbon composition which substantially and effectively eliminates the voltage suppression which occurs in the initial discharge of $Li/CF_x$ batteries.

SUMMARY OF THE INVENTION

In accordance with the invention, we have discovered a method of eliminating the initial voltage suppression which occurs in the discharge of $LiCF_x$ batteries. More particularly, the invention obviates the prior art practice of pre-discharging a battery to eliminate voltage suppression and provides a system which has a flat discharge curve, with voltage at the beginning of discharge substantially the same as voltage during the bulk of the discharge period of the battery.

In accordance with the discovery of the invention, the addition of a minor amount of a different $CF_x$, which has no significant voltage suppression, to the $CF_x$ normally used to prepare $Li/CF_x$ batteries, provides a blend which has little or no voltage suppression, and which introduces only a negligible loss in capacity. In preparing the improved composition, any coke-based $CF_x$ which has an initial closed circuit voltage of about 150 mv above the plateau voltage of the bulk $CF_x$ material and has a specific capacity above 600 mAH/gram, may be suitably employed as the additive $CF_x$. By use of a blended combination of at least two different $CF_x$ compositions according to the invention, voltage suppressions commonly occurring with $CF_x$, of the kinds that are normally used in $Li/CF_x$ batteries can be eliminated or substantially reduced. The improved system is effected by blending into a typical $CF_x$ employed in $LiCF_x$ systems, from about 0.5 to 20% of a different (additive) $CF_x$ which has no voltage suppression. The additive $CF_x$, generally a coke-based fluorinated carbon should preferably have a closed circuit voltage (CCV) of at least 150 mV but no more than about 350 mV above the plateau voltage of the commonly used $CF_x$, and have a specific capacity of at least 600 mAH/g.

BRIEF DESCRIPTION OF THE DRAWINGS

FIG. 4A illustrates the discharge curve of still another specific additive $CF_x$ and FIGS. 4B and 4C are discharge curves for 10% and 20% blends, respectively, of this $CF_x$ with bulk $CF_x$.

DESCRIPTION OF THE PREFERRED EMBODIMENT

Figure 2B:
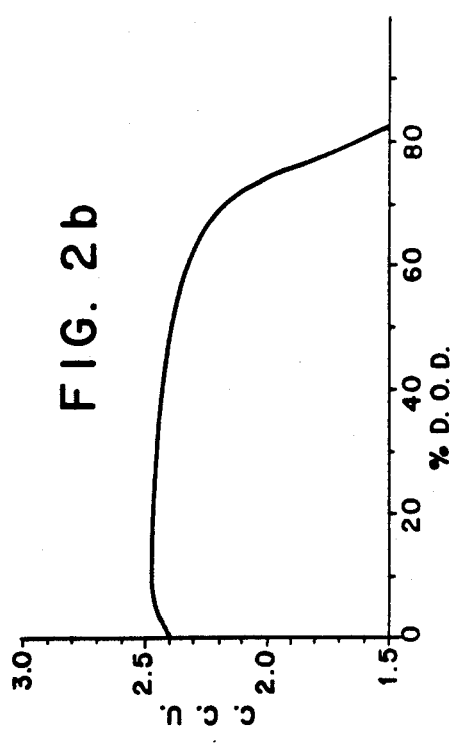
FIG. 2A illustrates the discharge curve for a specific additive $CF_x$ and FIGS. 2B and 2C are discharge curves for 10% and 20% blends thereof with bulk $CF_x$.

In accordance with the invention, pre-discharging of a $Li/CF_x$ battery is obviated by utilizing in the $CF_x$ composition an additive $CF_x$ which provides a flat discharge curve and so that voltage at the beginning of discharge is substantially the same level as voltage during the bulk of the discharge.

We have discovered that the addition of a small percentage of $CF_x$ which has no substantial voltage suppression to the $CF_x$ normally used to prepare $Li/CF_x$ batteries and has substantial voltage suppression leads to a combined composition which has little or no voltage suppression, and only a slight loss in capacity. As the additive, a coke-based $CF_x$ which has an initial closed circuit voltage 150 mV above the plateau voltage of the bulk material and a specific capacity above 600 mAH/g can be used. This additive $CF_x$ which has no significant voltage suppression, discharges at the beginning of discharge. The impact of the additive $CF_x$ which provides a relatively high initial voltage in the $CF_x$ blend results in higher combined voltage and substantially obviates the disadvantageous initial voltage suppression. The bulk $CF_x$ material, i.e. the $CF_x$ material, other than the additive $CF_x$, of course also discharges to the conventional "reduced" extent during this early stage of discharge. When the discharge voltage from the small percentage of additive is depleted, the bulk $CF_x$ has discharged to the point that it no longer shows voltage suppression.

The additive $CF_x$ may be present in amounts of from about 0.5% to about 50% but preferably in amounts of about 2% to about 30% and most advantageously in amounts of 5% to 20% of the combined weight of additive $CF_x$ and bulk $CF_x$.

The advantageous ability of the invention is due to the fact that the closed circuit voltage of a $Li/CF_x$ battery during the initial 10% of discharge is lower than the closed circuit voltage during the later stages. This characteristic adversely impacts applications. For example, a bulb powered by a $Li/CF_x$ battery would appear dim when powered by a fresh cell. Further, the voltage at beginning of life can be as low as the voltage indicating end of life; this complicates the design of circuitry to indicate a condition of the battery near end of life and in some cases of sensitive analytical apparatus, e.g. medical devices, may give misleading results.

Present commerical practice as indicated in the above-mentioned Japanese Kokai No. 82 124,865, for example, attempts to minimize the initial voltage suppression problem by discharging batteries as much as 10%, at the time of manufacture. This preliminary expenditure of energy minimizes but does not eliminate the problem of low voltage during the initial stage of discharge. The present, i.e. prior art attempts at avoidance of the voltage suppression thus suffers from several disadvantages: such as requiring additional steps in production of the batteries; or lost of expensive $CF_x$ raw material in the pre-discharge step.

The criticality in selecting an additive that is sufficiently different from the bulk $CF_x$ and provides an effective blend in accordance with the present invention, is demonstrated by the way of the examples which follow. In each example, the same bulk $CF_x$, available commerically from Allied Corporation as Accufluor® $CF_x$ grade 1000, having a fluorine content greater than 61% is used.

Figure 1:
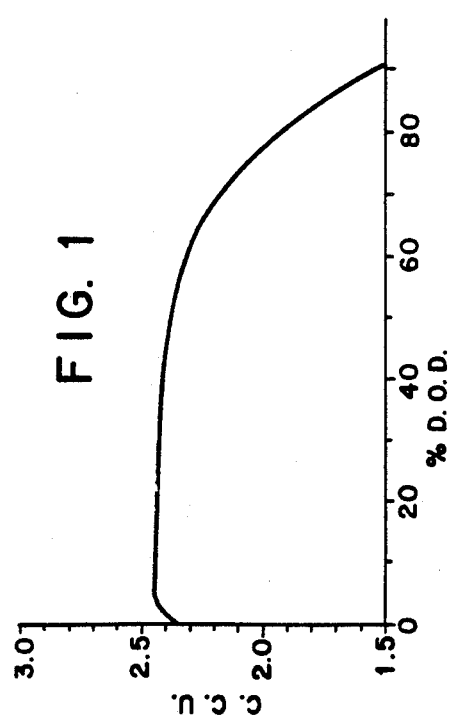
FIG. 1 shows a discharge curve for bulk $CF_x$ illustrating a relatively substantial suppression at the initial part of the battery discharge occurs.

The discharge curve for this commercially available $CF_x$ is illustrated in FIG. 1 in which the change in closed circuit voltage (CCV) relative to the percent depth of discharge (DOD) is plotted. The suppression of the voltage in the early stages using this unmodified $CF_x$ lowers the cell voltage by approximately 150 mV. For many applications, this suppression would be disadvantageous.

The invention will be further described by the following specific examples. It will be understood that although these examples may describe in detail certain preferred operating conditions of the invention, they are given primarily for purposes of illustration and the invention in its broader aspects is not to be regarded as limited thereto.

GENERAL PROCEDURE

The $CF_x$ material used as an additive in the practice of the invention to obviate the undesirable initial voltage suppression was mixed or blended into the bulk $CF_x$ in two different ratios and the discharge performances of the bulk $CF_x$, alone, the additive, alone, and two blends of each additive with the bulk $CF_x$ were determined. Discharge was effected by making the $CF_x$ or $CF_x$ blend into a battery electrode (cathode) using a lithium anode non-aqueous electrolyte cell incorporating these cathodes, and then discharging the cell across a fixed 1 Kohm resistive load. Cell voltage was monitored and cell capacity was calculated from the discharge curve.

EXAMPLE I

Figure 2C:
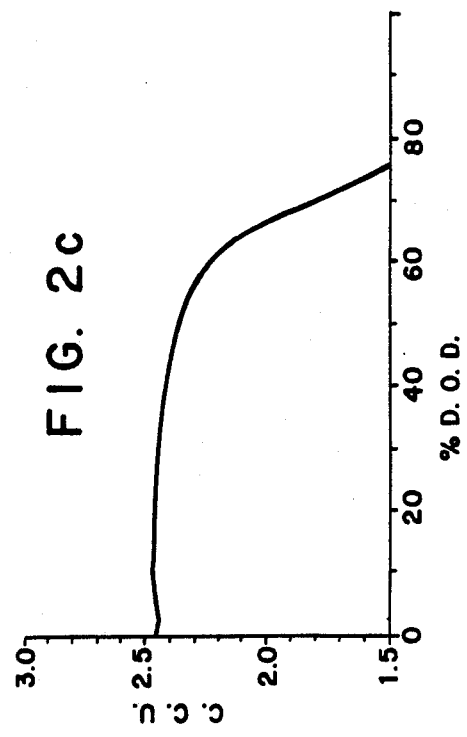
Figure 2A:
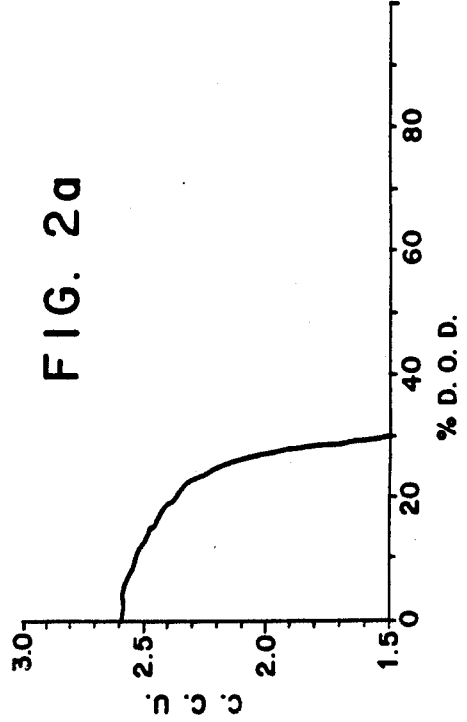

Additive $CF_x$ material having a specific capacity of 259 mAH/g was prepared by reacting 100 g of coke with fluorine at 350° C. in a 5% fluorine atmosphere flowing at 150 sccm for a period of six hours. This coke-based fluorinated $CF_x$ additive was blended with the bulk $CF_x$. The performance of the additive, $CF_x$ by itself before it was mixed with the bulk $CF_x$, and a 10% and 20% blend are shown in FIGS. 2A, 2B and 2C respectively. The CCV of the 10% blend (FIG. 2B) during the early stages of discharge is suppressed, although not to the same extent as that of the bulk $CF_x$ without the additive, (FIG. 1). The closed circuit voltage (CCV) of the 20% blend (FIG. 2C) is only slightly suppressed during the initial stages of discharge. This 20% blend is 14% lower in specific capacity as shown in Table I.

EXAMPLE II

Figure 3A:
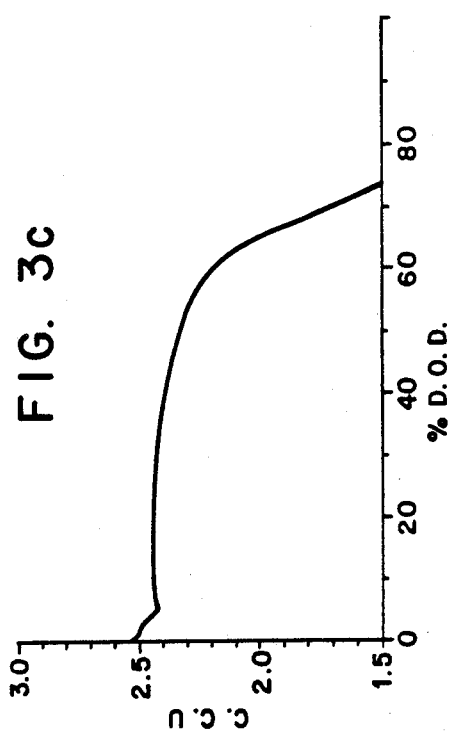
FIG. 3A illustrates the discharge curve for another specific additive $CF_x$ and FIGS. 3B and 3C are the discharge curves for 10% and 20% blends, respectively, of this $CF_x$ with bulk $CF_x$.
Figure 3B:
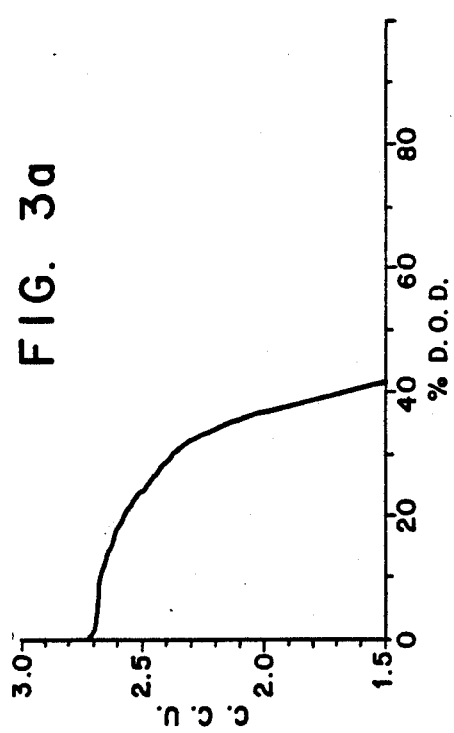
Figure 3C:
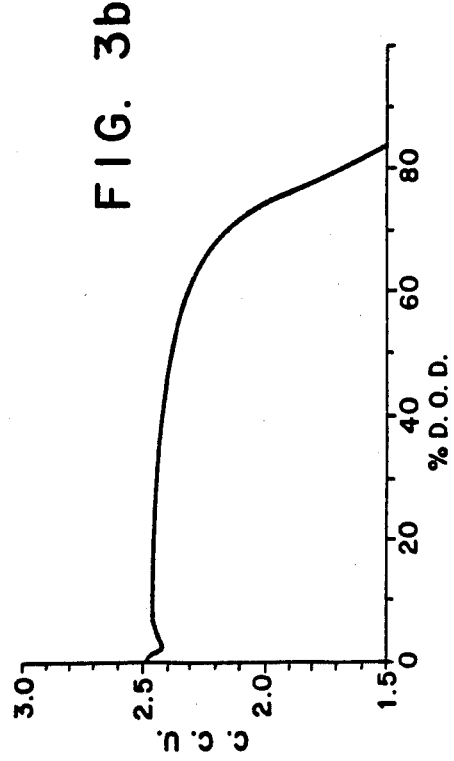

In this example, the coke-based $CF_x$ additive used has a specific capacity of about 358 mAH/g. This material was prepared by reacting 100 g of coke in a 15% fluorine atmosphere flowing at 150 sccm at a temperature of 350° C. for a period of 6 hours. This material has a higher initial voltage and appreciably greater specific capacity as compared to the coke-based $CF_x$ additive in Example 1. FIG. 3A shows the discharge of the additive $CF_x$ material above. The performances of the 10% and 20% coke-based $CF_x$ in bulk $CF_x$ blends are shown in FIGS. 3B and 3C. Both blends (FIGS. 3B and 3C) show voltage suppression. Since the voltage of this additive is higher than the voltage of the additive in Example 1, it is more preferentially discharged during the initial stages, i.e. the first 5 percent. This blended material even with additive has somewhat greater capacity, but is not as advantageous as the blend of Examples IV.

EXAMPLE III

In this example, the $CF_x$ additive has a suitable capacity and very high initial voltage. This material was made from a coke which is more difficult to fluorinate (i.e., requires higher temperatures and/or higher concentrations of fluorine in the gas stream to make a product with a C:F of 1:1) than the coke used in Examples I, II and IV. A 5 gram sample of this coke was fluorinated at 400° C. for a period of 10 hours in a 2.5% fluorine atmosphere flowing at 5.3 sccm. FIG. 4A shows the discharge performance of the additive $CF_x$ material alone. FIGS. 4B and 4C show the performance of the 10% and 20% blends. The effect of this additive is readily discernable in the blends. It should be noted, however, that while voltage suppression during the initial stages of discharge has been eliminated, the initial voltage may be excessive for use with some electronic devices. Also, the relatively extreme sloping character of the voltage during the initial stages of discharge may make it, comparatively less advantageous for some applications than the blend set forth in Example IV.

EXAMPLE IV

The $CF_x$ additive prepared as follows best demonstrates the characteristics of a preferred additive. This coke-based $CF_x$ additive was prepared by reacting 50 grams of coke at 350° C. in a 15% fluorine atmosphere flowing at 150 sccm for a period of 6 hours. The initial voltage of this additive by itself is about 170 mV plateau above the voltage of the bulk $CF_x$ by itself (FIG. 1) in the initial parts of the discharge plateau (i.e., the initial voltage of the additive in this example is about 2.6V and the voltage of the bulk $CF_x$ in the plateau area, at about 20% DOD, is about 2.43V; 170 mV below that of the additive). This difference in voltage is sufficient to cause the additive to discharge preferentially, masking the voltage suppression in the bulk $CF_x$, yet the voltage difference of the additive $CF_x$ is not so large as to cause a high initial voltage (as in Example 3). The specific capacity of this additive is high compared to those in Examples 1 and 2, therefore a large sacrifice in capacity is not incurred when even 20% of this additive is blended with the bulk $CF_x$.

Figure 5A:
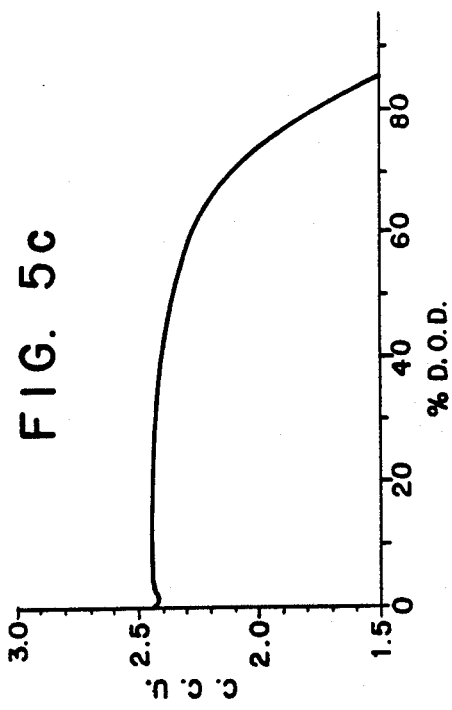
FIG. 5A illustrates the discharge curve of a further specific additive $CF_x$ material and FIGS. 5B and 5C are the discharge curves for 10% and 20% blends, respectively, of this $CF_x$ with bulk $CF_x$.
Figure 5B:
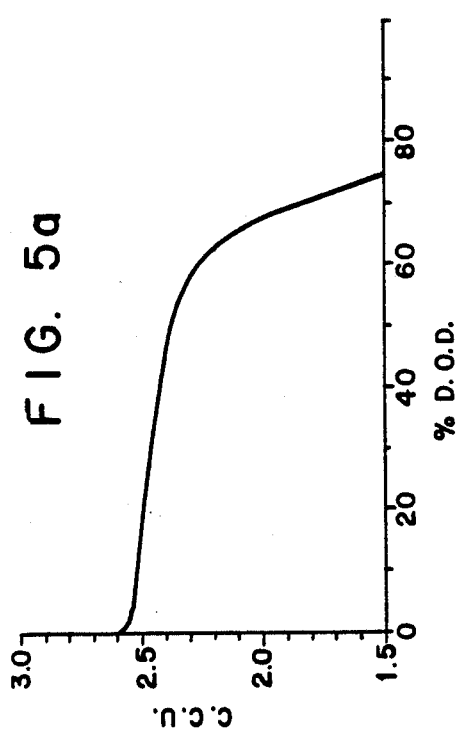
Figure 5C:
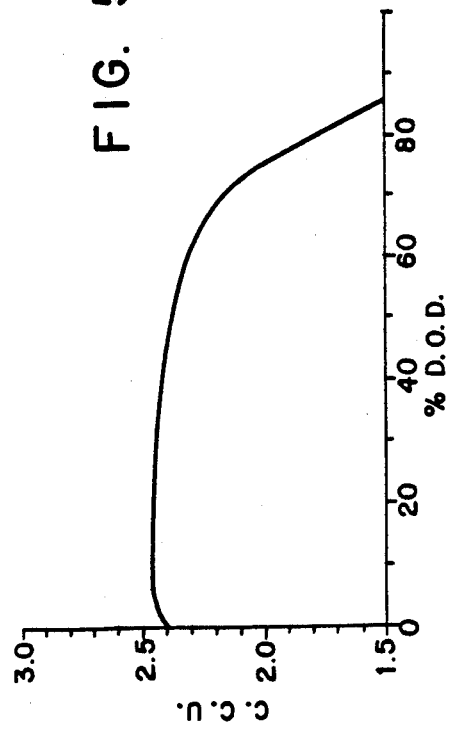

FIG. 5A shows the discharge performance of the additive (unblended) coke-based $CF_x$ material of this example alone. FIGS. 5B and 5C show the performance of the 10% and 20% blends. The 20% blend shows only slight voltage suppression and a specific capacity only 7% lower than that of the unblended bulk $CF_x$.

TABLE 1

| Example & Additive Amounts | Voltage Performance | Specific Capacity |
|---|---|---|
| Bulk $CF_x$ (unmodified) | very large suppression | 770 |
| I - 10% | suppression | 713 |
| 20% | slight suppression | 661 |
| II - 10% | suppression | 715 |
| 20% | slight suppression | 658 |
| III - 10% | high initial voltage | 711 |
| 20% | high initial voltage | 726 |
| IV - 10% | voltage suppression | 739 |

TABLE 1-continued

| Example & Additive Amounts | Voltage Performance | Specific Capacity |
|---|---|---|
| 20% | slight suppression | 717 |

From the foregoing, it is seen that the coke-based $CF_x$ additive provides an initial CCV of about 150 mV higher than the plateau voltage of the bulk $CF_x$. The preferred blend is that which gives minimal voltage suppression while retaining the highest specific capacity, e.g. that of Example IV with 20% $CF_x$ additive. The initial CCV of the additive should not be any higher than about 250-300 mV above the plateau voltage of the bulk $CF_x$ if a high initial voltage condition in the blend is to be avoided.

The specific capacity of the additive should be at least about 600 mAH/g with higher capacities being preferable. Using additives with specific capacities below about 600 mAH/g will mean that higher loading of the additive may be required and lower specific capacity of the blend will result.

It will be understood that a wide range of compositions and resulting products may be made within the ranges disclosed herein and, therefore, the proportions and conditions disclosed for illustrative purpose should not be construed as limitations on the invention except as set forth in the claims which follow.

What is claimed:

1. A fluorinated carbon ($CF_x$) composition comprising a blend of at least two different $CF_x$ compositions which are derived from petroleum-based coke products which have been prepared by heat treatment at a temperature between about 800° C. and 2,000° C.: (a) a bulk $CF_x$ and (b) an additive $CF_x$ and wherein from about 0.5 percent to about 50 percent of (b) is characterized as having a closed circuit voltage of at least 150 mV above the plateau voltage of the bulk $CF_x$ and a specific capacity above 600 mAH/g.

2. The composition of claim 1 wherein the relative proportions of (a) and (b) are in the ranges of 70 percent to 98 percent and 30 percent to 2 percent, respectively.

3. The composition of claim 1 wherein the relative proportions of (a) and (b) are in the ranges of 80 to 95 percent and 20 to 5 percent, respectively.

* * * * *